US011093625B2

(12) United States Patent
Vijayvargiya et al.

(10) Patent No.: US 11,093,625 B2
(45) Date of Patent: Aug. 17, 2021

(54) ADAPTIVE FILE ACCESS AUTHORIZATION USING PROCESS ACCESS PATTERNS

(71) Applicant: VMWARE, INC., Palo Alto, CA (US)

(72) Inventors: Shirish Vijayvargiya, Pune (IN); Sachin Shinde, Pune (IN); Amol Shivram Katkar, Pune (IN); Vivek Parikh, Pune (IN)

(73) Assignee: VMWARE, INC., Palo Alto, CA (US)

( * ) Notice: Subject to any disclaimer, the term of this patent is extended or adjusted under 35 U.S.C. 154(b) by 218 days.

(21) Appl. No.: 16/505,743

(22) Filed: Jul. 9, 2019

(65) Prior Publication Data

US 2020/0356686 A1 Nov. 12, 2020

(30) Foreign Application Priority Data

May 9, 2019 (IN) .............................. 201941018613

(51) Int. Cl.
| | |
|---|---|
| *G06F 21/62* | (2013.01) |
| *G06F 21/54* | (2013.01) |
| *G06F 21/55* | (2013.01) |
| *G06F 21/56* | (2013.01) |
| *G06F 9/455* | (2018.01) |

(52) U.S. Cl.
CPC .......... *G06F 21/62* (2013.01); *G06F 9/45558* (2013.01); *G06F 21/54* (2013.01); *G06F 21/554* (2013.01); *G06F 21/566* (2013.01); *G06F 21/568* (2013.01); *G06F 2009/45587* (2013.01); *G06F 2221/2141* (2013.01)

(58) Field of Classification Search
CPC ...... G06F 21/62; G06F 9/45558; G06F 21/54; G06F 21/554; G06F 21/566; G06F 21/568
USPC .......................................................... 726/26
See application file for complete search history.

(56) References Cited

U.S. PATENT DOCUMENTS

| | | | | |
|---|---|---|---|---|
| 8,671,406 | B1 * | 3/2014 | Gopal | G06F 9/44526 |
| | | | | 718/1 |
| 10,691,638 | B1 * | 6/2020 | Lyadvinsky | G06F 3/0622 |
| 2017/0003999 | A1 * | 1/2017 | Dalal | G06F 12/0802 |
| 2017/0149807 | A1 * | 5/2017 | Schilling | G06F 21/56 |
| 2017/0153909 | A1 * | 6/2017 | Zhang | G06F 9/45558 |

OTHER PUBLICATIONS

Søren Nøhr Christensen et al., "Process-Based Access Control (Pbac)"Aalborg University—Computer Science Dept. & CISS. Fradrik Bajers Vej 7, DK-9220 Aalborg Ø, Denmark, 14 pages.

\* cited by examiner

*Primary Examiner* — Kambiz Zand
*Assistant Examiner* — Phuc Pham
(74) *Attorney, Agent, or Firm* — SU IP Consulting

(57) ABSTRACT

Example methods are provided for adaptive file access authorization using process access patterns. In a learning mode, attributes and other information, which are associated with applications or with processes that are related to the applications and that attempt to access a file system, are collected and used to generate a policy. In a protected mode, file access requests are examined against the policy, and are granted access to the file system or are denied access to the file system based on the contents of the policy. The policy may be updated so as to adapt to changes in the access patterns and to changes in the application or processes.

20 Claims, 4 Drawing Sheets

ADAPTIVE FILE ACCESS AUTHORIZATION USING PROCESS ACCESS PATTERNS

RELATED APPLICATIONS

Benefit is claimed under 35 U.S.C. 119(a)-(d) to Foreign Application Serial No. 201941018613 filed in India entitled "ADAPTIVE FILE ACCESS AUTHORIZATION USING PROCESS ACCESS PATTERNS", on May 9, 2019, by VMWARE, Inc., which is herein incorporated in its entirety by reference for all purposes.

BACKGROUND

Unless otherwise indicated herein, the approaches described in this section are not admitted to be prior art by inclusion in this section.

In a computing environment, an access control list (ACL) is often used to control a user's access to a file system, for example by allowing or denying access by the user to files, data, applications, etc. An ACL typically is user-based in that the ACL specifies a particular user's file access rights and permissions, such as whether the user can read from, write to, or execute a particular file. Generally, an ACL allows any process launched by an authorized user to access all of the files associated with the user. Thus, if an authorized user is compromised, then the files associated with that user can be potentially accessed/modified maliciously by any process launched by that user. An example of this scenario is ransomware. Ransomware unknowingly launched from or otherwise unintentionally associated with an authorized user can access/modify the files associated with the user, such as by encrypting the files, thereby rendering the files useless until a "ransom" is paid to decrypt the files.

SUMMARY

According to one aspect, a method is provided to perform process-based file access control in a virtualized computing environment. The method includes, during a learning mode: collecting, by an agent, information related to a plurality of processes that request access to at least one file stored in a file system associated with the virtualized computing environment, wherein a policy is generated from the collected information, and wherein the policy indicates that the plurality of processes are authorized to access the at least one file, and during a protected mode: trapping, by the agent, a file access request sent by a process, wherein the file access request is requesting access to the file system; capturing, by the agent, information related to the process; checking, by the agent, the captured information against the policy; in response to the checking having verified that the process is one of the plurality of processes that are authorized to access the file system, allowing the process to access the file system; and in response to the checking being unable to identify the process as one of the plurality of processes that are authorized to access the file system, denying access by the process to the file system.

According to another aspect, a system is provided to perform process-based file access control in a virtualized computing environment. The system includes: an agent; wherein during a learning mode: the agent is configured to collect information related a plurality of processes that request access to at least one file stored in a file system associated with the virtualized computing environment, wherein a policy is generated from the collected information, and wherein the policy indicates that the plurality of processes are authorized to access the at least one file; and wherein during a protected mode: the agent is configured to trap a file access request sent by a process and which is requesting access to the file system; the agent is configured to capture information associated with the process; the agent is configured to check the captured information against the policy; the agent is configured to, in response to the checking having verified that the process is one of the plurality of processes that are authorized to access the file system, allow the process to access the file system; and the agent is configured to, in response to the checking being unable to identify the process as one of the plurality of processes that are authorized to access the file system, deny access by the process to the file system.

DETAILED DESCRIPTION

Figure 1:
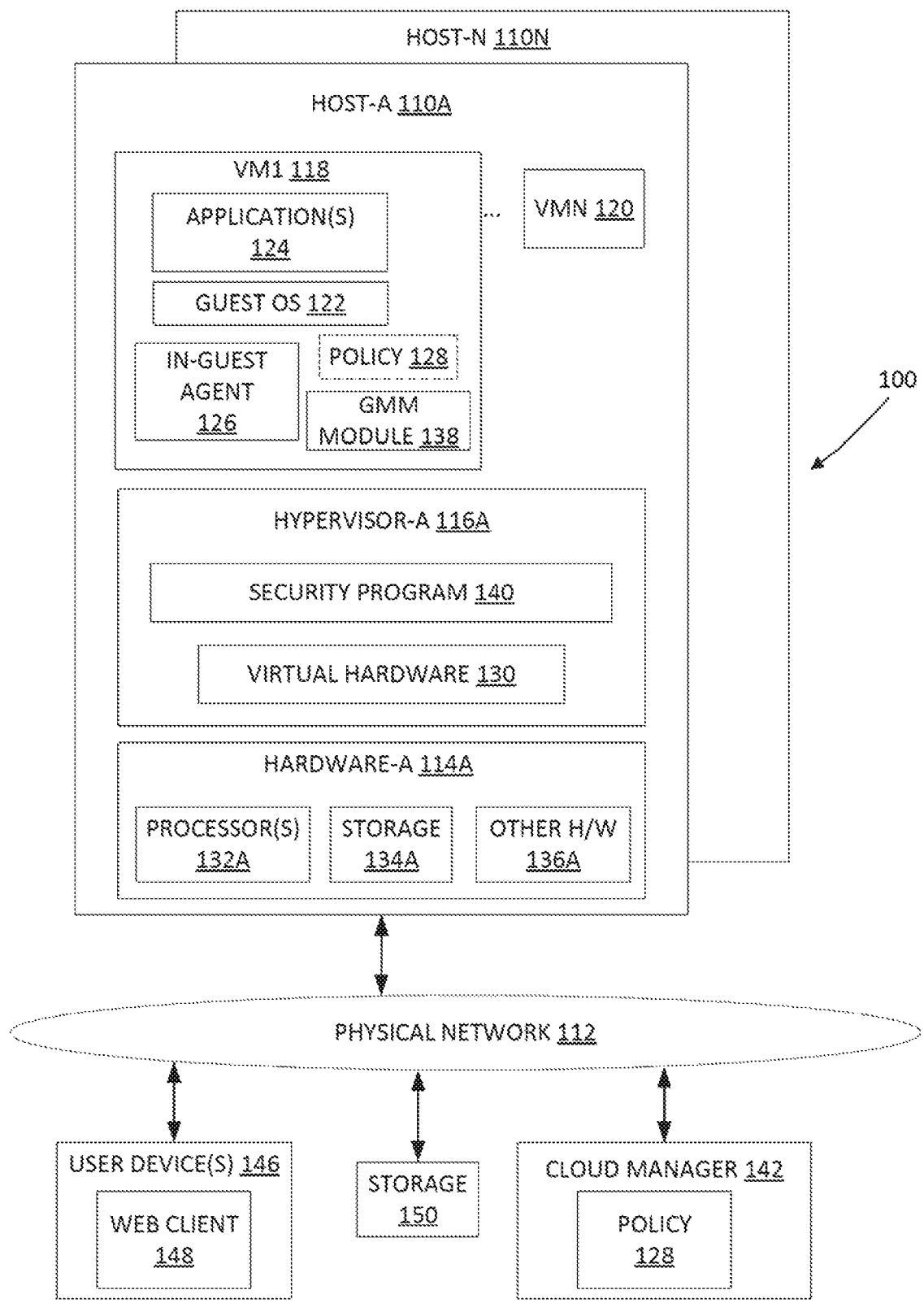
FIG. 1 is a schematic diagram illustrating an example virtualized computing environment in which adaptive file access authorization using process access patterns may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses the above-described drawbacks, by placing restrictions on a process' capability to access files even though the process is launched by an authorized user. The process may be allowed or denied access to files, based on a policy that was generated based on the process' file access patterns/history.

Computing Environment

The technology described herein may be implemented in a virtualized computing environment in some embodiments. Virtualization allows the abstraction and pooling of hardware resources to support virtual machines in a virtualized computing environment, such as a software-defined datacenter (SDDC). For example, through server virtualization, virtual machines running different operating systems may be supported by the same physical machine (e.g., referred to as a "host"). Each virtual machine may be generally provisioned with virtual resources to run an operating system and applications. The virtual resources may include central processing unit (CPU) resources, memory resources, storage resources, network resources, etc.

Various implementations will now be explained in more detail using FIG. 1, which is a schematic diagram illustrating an example virtualized computing environment 100 in which adaptive file access authorization, using process access patterns, can be performed. Depending on the desired implementation, virtualized computing environment 100 may include additional and/or alternative components than that shown in FIG. 1.

In the example in FIG. 1, virtualized computing environment 100 includes multiple hosts, such as host-A 110A host-N 110N that may be inter-connected via a physical network 112. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other host-N 110N can include substantially similar components and features.

The host-A 110A includes suitable hardware 114A and virtualization software (e.g., hypervisor-A 116A) to support various virtual machines (VMs). For example, the host-A 110A supports VM1 118 . . . VMN 120. In practice, the virtualized computing environment 100 may include any number of hosts (also known as a "computing devices", "host computers", "host devices", "physical servers", "server systems", "physical machines," etc.), wherein each host may be supporting tens or hundreds of virtual machines. For the sake of simplicity, the details of only the single VM1 118 is shown and described herein.

VM1 118 may include a guest operating system (OS) 122 and one or more guest applications 124 (and their corresponding processes) that run on top of the guest operating system 122. VM1 118 may also include an in-guest agent 126 and a copy of a policy 128. The in-guest agent 126 of various embodiments may be in the form of a daemon or other software/code that runs in a background process and is hidden from the user. Further details of the features and use of the in-guest agent 126 and the policy 128 will be described later below with respect to FIGS. 2-4.

The hypervisor 116A may be a software layer or component that supports the execution of multiple virtualized computing instances. The hypervisor 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the applications 124 (e.g., Microsoft Word, Microsoft Excel, etc.) in VM1 118. Corresponding to the hardware 114A, the virtual hardware 130 may include a virtual CPU, a virtual memory, a virtual disk, a virtual network interface controller (VNIC), etc.

In one embodiment, a guest monitoring mode (GMM) module 138 may be a secure enclave created in VM1 118 using a hypervisor-based enclave technology. The secure enclave of VM1 118 (for the GMM module 138) may be a region of memory in a guest memory address space of VM1 118 that is isolated from, and thus inaccessible by, all other processes running in the VM1 118 (including privileged processes like the guest OS 122 kernel). Thus, any code running in the GMM module 138 cannot be compromised via attacks within VM1 118, including attacks that target the guest OS 122. The GMM module 138 of one embodiment may be a software program or other computer-readable instructions. Further details of the GMM module 138 will be provided later below.

Moreover in one embodiment, a security program 140 may run on top of or within the hypervisor 116A. In the example embodiment of FIG. 1, the security program 140 is depicted as running within or as part of the hypervisor 116A. In other embodiments, the security program 140 may run within or may be installed at other locations within the host-A 110A. As will be described with respect to FIGS. 2-4, security program 140 may be configured to collect information associated with the applications 124 and with the processes related to the applications 124, for purposes of generating the policy 128 that specifies which process can access certain files/data. The security program 140 can also be configured to enforce the policy 128 after the policy is generated.

Although FIG. 1 shows the security program 140 as a single discrete component, the security program 140 of another embodiment can be implemented using distributed components that include or otherwise work in conjunction with the in-guest agent 126, the GMM module 138, and a cloud manager 142. One example of the security program 140 is the AppDefense™ product from VMware, Inc. of Palo Alto, Calif.

The cloud manager 142 of one embodiment can take the form of a physical computer with functionality to manage or otherwise control the operation of host-A 110A . . . host-N 110N. For example, the cloud manager 142 may be a physical computer that provides a management console and other tools that may be used by a system administrator to evaluate file access requests for potential threats. The cloud manager 142 may be communicatively coupled to host-A 110A host-N 110N (and hence communicatively coupled to the virtual machines, hypervisors, in-guest agents, hardware, etc.) via the physical network 112. The host-A 110A host-N 110N may in turn be configured as a datacenter that is managed by the cloud manager 142.

In some embodiments, the functionality of the cloud manager 142 may be implemented in any of host-A 110A host-N 110N, instead of being provided as a separate stand-alone device such as depicted in FIG. 1. In various embodiments that will be described further with reference to FIGS. 2-4, the cloud manager 142 generates the policy 128 based on information collected by the in-guest agent 126, and provides the generated policy 128 to the in-guest agent 126 for enforcement. In FIG. 1, the policy 128 is drawn with solid lines within the cloud manager 142, while the policy 128 is drawn with broken lines within the in-guest agent 126. This difference in drawing formats is generally intended as a representation that the policy 128 at the in-guest agent 126 is a copy of the policy 128 at the cloud manager 142. At various periods of time, the policy 128 at the in-guest agent 126 may have identical or substantially identical content as the policy 128 at the cloud manager 142. At other periods of time, the policy 128 at the in-guest agent 126 may have more substantial differences in content relative to the policy 128 at the cloud manager 142, such as when the cloud manager is updating the policy 128 and has not yet provided the updated content to the in-guest agent 126.

A user may operate a user device 146 to access, via the physical network 112, the functionality of VM1 118 . . . VMN 120, using a web client 148. Web client 148 may be any suitable browser-based application in one embodiment. In other embodiments, the user may directly operate host-A 110A as a user device in order to access the functionality of VM1 118 . . . VMN 120, instead of using the separate user device 146 via the physical network 112.

One or more storage devices 150 are accessible to the virtual machines via the physical network 112. The storage device(s) 150 may include a file system that stores files and their data. It is this file system (files and data) in the storage device(s) 150 for which the various embodiments described herein monitor file access requests for purposes of providing more controlled access. Alternatively or additionally, such file system (files and data) may be stored in the storage device 134A in the host-A 110A. Still further, the storage device(s) 134A or 150 may store software or other computer-readable instruction, which in response to execution by a processor (such as the processor 132A), perform or control performance of the operations of the security program 140 described herein (including operations related to the in-guest agent 126, the GMM module 138, and the cloud manager 142). Depending on various implementations, one or more of the physical network 112, the cloud manager 142, the user device(s) 146, and the storage device(s) 150 can comprise parts of the virtualized computing environment 100, or one or more of these elements can be external to the virtualized computing environment 100 and configured to be communicatively coupled to the virtualized computing environment 100.

Adaptive File Access Authorization Using Process Access Patterns

Figure 2:
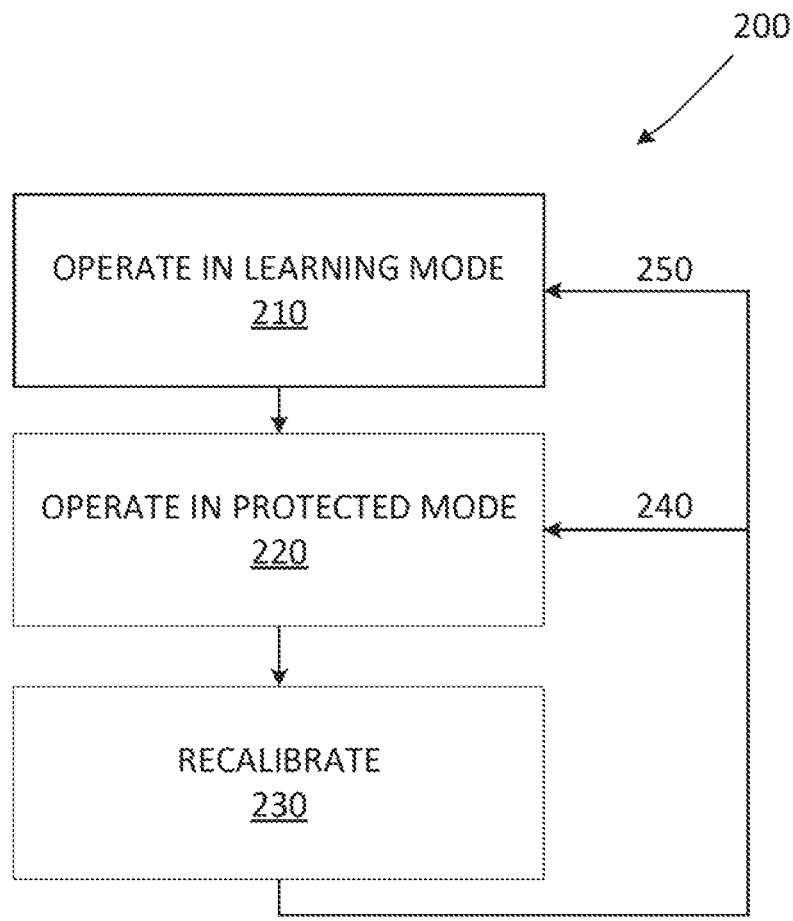
FIG. 2 is a flowchart of an example method for adaptive file access authorization using process access patterns that can be performed in the virtualized computing environment in FIG. 1.

According to examples of the present disclosure, file access authorization can be based on previous process access patterns. The file access authorization can be adaptive in that as a user's and the user's processes' access patterns change and evolve over time, such access patterns can be "learned" or otherwise recorded and used to update and/or otherwise modify the user's or the user's processes' file access authorizations. In more detail, FIG. 2 is a flowchart of an example method 200 for adaptive file access authorization using process access patterns. The method 200 can be implemented in the virtualized computing environment 100 in one embodiment. In another embodiment, the method 200 can be implemented in some other type of computing environment (which may not necessarily involve a virtualized computing environment), wherein it would be beneficial to control a process' access to a file system. Example method 200 may include one or more operations, functions, or actions illustrated by one or more blocks, such as blocks 210 to 230. The various blocks of the process 200 and/or of any other process(es) described herein may be combined into fewer blocks, divided into additional blocks, supplemented with further blocks, and/or eliminated based upon the desired implementation.

According to one embodiment, the method 200 may be performed by the security program 140, in cooperation with the in-guest agent 126, the GMM module 138, and the cloud manager 142. For example, the security program 140 may be controlled by the cloud manager 142, and the security program 140 may in turn control or operate the in-guest agent 126 and the GMM module 138.

At block 210 ("Operate in learning mode") in FIG. 2, the security program 140 operates the virtual machine in the learning mode. For example, the security program 140 instructs the in-guest agent 126 to run in the learning mode, so as to enable the in-guest agent 126 to begin capturing certain pieces of information about process(es) being run at the virtual machine. Examples of the kinds of information that are captured by the in-guest agent 126 at block 210 will be described in detail with respect to FIG. 3. The captured information can then be used by the cloud manager 142 to build a manifest of expected behavior (e.g. the policy 128) for the processes launched from the virtual machine.

In one embodiment, the virtual machine is operated in an isolated or otherwise secure environment during the learning mode. In the secure environment, the user and/or processes launched by the user may have restrictions on particular files and/or network resources that can be accessed, restrictions on the type or amount of interactions with other virtual machines, and/or other restrictions that control the access rights of the virtual machine to the full suite of software and hardware resources that would otherwise be made available to a virtual machine that is not operating in a secured environment. Furthermore, the operation of the virtual machine in the secure environment may be more closely monitored by a system administrator and/or by system administrator tools. An example of a secure environment is a sandbox environment. Other implementations of secure environments may be used, wherein the processes from the virtual machine are restricted and closely monitored.

The security program 140 can control the in-guest agent 126 to operate in the learning mode for any duration of time that is sufficient to capture information about processes for the purposes of building the policy 128. In one example, the learning mode can span about 3 weeks, with the rationale being that 3 weeks will typically be sufficient to capture information about processes for purposes of building at least a rudimentary and workable policy 128. In other examples, the learning mode can span from about 3 weeks to 2 months. In still other examples, the learning mode can span less than 3 weeks, including durations measured in numbers of days. The duration of the learning mode (and whether to maintain, extend, or shorten the duration) can be influenced by factors such as the number of processes being launched by the virtual machine, the amount of deviations versus redundancies of the processes that are observed over time, the amount of new processes that are observed over time, the desired comprehensiveness of a policy (e.g., a simple rudimentary policy versus a detailed complex policy), the frequency of updates to applications associated with the processes, the preferences of the system administrator, and other factors or combinations thereof.

As an illustration, a shorter duration for the learning mode may be appropriate for a virtual machine that launches only a few processes and such processes perform the same or similar file accesses repeatedly. Thus, a relatively shorter duration for the learning mode may be sufficient in this scenario where the file access patterns of the processes are relatively straightforward-providing a longer duration for the learning mode may not necessarily capture further information that would substantially contribute to the policy 128 that is to be generated. As another illustration, a relatively longer duration for the learning mode may be appropriate for a virtual machine that launches many processes and such processes are in turn less predictable as to the files that they access and/or such processes and their corresponding applications 124 are constantly being updated. Thus, a longer duration for the learning mode would be beneficial in order to capture the many variations and deviations of such processes that occur over a period of time, and as a result, the cloud manager 142 can build a more comprehensive policy 128.

After sufficient information is captured and used to build a policy 128 during the learning mode at block 210, the process switches from operating in the learning mode at block 210 to operating in the protected mode at block 220 ("Operate in protected mode"). In one embodiment, a system administrator can use a management console at the cloud manager 142 to instruct the in-guest agent 126 to switch to the protected mode.

According to various embodiments of the protected mode, the in-guest agent 126 traps a file access request by a process, and checks the policy to determine whether the requested file access is allowed. If the policy permits the file access, then the in-guest agent 126 releases file access request so as to enable the process to access the file at the file system. If, however, the policy does not allow the file access, then the in-guest agent 126 either blocks the file access request so as to prevent the process from accessing the file system, or sends an alert to the cloud manager 142 so that the cloud manager 142 can make a further determination as to whether or not to allow the file access. Further details of the protected mode are provided below with respect to FIG. 4.

The process 200 of one embodiment may include a further block 230 ("Recalibrate") for recalibrating the policy. For example, during the course of operating in the protected mode, the in-guest agent 126 may trap a file access request that is not identified by the policy as being an allowed file access. The cloud manager 142 may then subsequently determine that this file access request is not malicious and then instruct the in-guest agent 126 to release the file access request. In such a scenario, the recalibration may be triggered at block 230 such that the policy is updated to identify that particular file access as an allowed access. This policy update may occur during the protected mode as represented at 240 in FIG. 2, without having to return the in-guest agent 126 and/or the virtual machine to the learning mode at block 210.

In other situations, the recalibration is triggered at block 230 such that the in-guest agent 126 and/or the virtual machine is reset to the learning mode, such as represented at 250 in FIG. 2. For example, the processes may have been updated or evolved to such an extent that the current policy is determined by the cloud manager 142 to be obsolete or inaccurate, and therefore needs to be substantially modified or replaced. Alternatively or additionally, there may be many new or updated processes that are being launched by the virtual machine and for which insufficient information was captured during a previous learning mode. Thus, re-entering the learning mode at 250 may be appropriate in order to enable the in-guest agent 126 to capture information about these processes in order to enable the cloud manager 142 to update or replace the existing policy.

In some embodiments, other events may trigger the recalibration of the policy at block 230. For example, applications/processes are often in a constant state of change with software patching and system updates, etc. Such changes can occur monthly, weekly, or daily. The in-guest agent 126 of one embodiment detects change in the applications 124 and reports to the cloud manager 142. The cloud manager 142 verifies the updates with the software catalogs/golden image/security team described next with respect to FIG. 3, and adapts/recalibrates the policy 128 accordingly.

Figure 3:
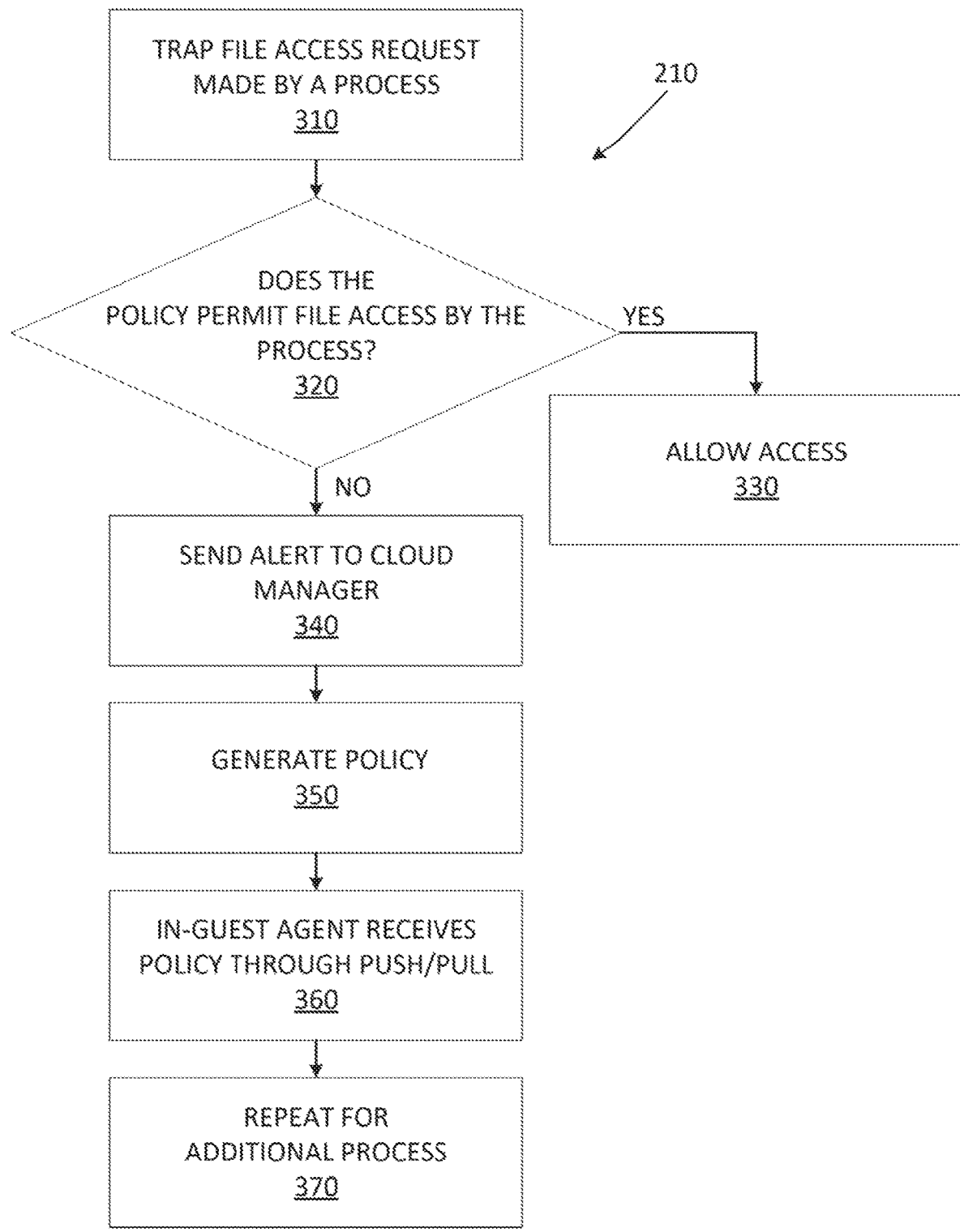
FIG. 3 is a flowchart of an example detailed process for a learning mode that can be performed by the method of FIG. 2 in the virtualized computing environment of FIG. 1.

FIG. 3 is a flowchart of an example detailed process for a learning mode that can be performed in the virtualized computing environment 100 of FIG. 1. Specifically, FIG. 3 shows more details of the operations that are performed by the method 200 during learning mode in block 210 of FIG. 2, in accordance with one embodiment.

Initially for the learning mode depicted at 210 in FIG. 3 and as previously explained above, it is assumed that the virtual machine and in-guest agent 126 are configured in the isolated and secure environment. At block 310 ("Trap file access request made by a process"), the in-guest agent 126 traps a file access request that is made by a process (sometimes referred to as a "binary"). For example, an application being executed by the virtual machine may request a file or other data from the file system. The file access request made by the process can be in the form of a data packet that contains the request, a system call, a GET request, or any other form of communication that identifies one or more of: the source (such as an identifier of an application or its associated process that is the originator of the request), the destination (such as a storage location where the file or its data is stored), and/or the particular file or its data that is being requested.

In one embodiment, the in-guest agent 126 may capture some information about the process and/or about the associated application(s) prior to the run-time of the processes. Examples of such information/attributes that can be captured/collected prior to the run-time can include but not be limited to the following:

Package details such package vendor name and package publisher information of the process;

Process binary name and path;

Process identifier (ID);

Process start time;

Process command line interface (CLI);

Cryptographic hash (e.g., MD5 and SHA256) of the process binary;

Binary certificate;

Process status (e.g., "starting" for new processes and "running" for pre-running processes); and Parent process information (e.g., the parent process' ID, start time, binary path, CLI, hash, and status).

The above information/attributes about the applications or their processes are examples. Some embodiments of the in-guest agent 126 may not collect some of the information above and/or may collect other information. Moreover in some embodiments of the in-guest agent 126, the above information or other run-time attributes may be collected during or after file access requests are made, alternatively or additionally to capturing such information prior to trapping the file access request.

After the file access request is trapped and in addition to the process attributes and application attributes identified above that may be collected prior to or during the run-time, the in-guest agent 126 of one embodiment can collect the file name information and path information associated with a file being requested in the file access request. The in-guest agent 126 may also collect other file attributes, such as a file access control list (ACL) that identifies the user and/or process that can access a particular file.

Furthermore during the learning mode, the in-guest agent 126 can capture at least some of the following information:

Which process and/or user owns the data—the creator of the data may be "an owner" for example;

Which process and/or user has seen (e.g., has accessed) the data;

Which process and/or user has modified (e.g., has written to) the data;

Which process and/or user has access rights to the data; and

Frequency of usage of the data.

In one embodiment, the trapping at block 310 may involve temporarily holding the file request in a buffer, cache, or other storage location associated with the virtual machine, until such time that the in-guest agent 126 and/or the cloud manager 142 determines that the file access request should be allowed, or until such time that the cloud manager 142 is able to identify the file access request as a legitimate request that can be added to the policy 128.

After trapping the file access request and capturing information associated with the file access request at block 310, the in-guest agent 126 makes a determination at block 320 ("Does the policy permit file access by the process?") as to whether the process is allowed to access the file system. In one embodiment, this determination is made by looking up the process and/or its attributes in the policy 128. If the in-guest agent 126 then locates ("Yes" at block 320) the process and/or its attributes in the policy 128, or otherwise determines from the policy 128 that the access is allowed, then the in-guest agent 126 release the file access request so as to enable the process to access the file and/or the its data at block 330 ("Allow access").

In a typical implementation, the policy 128 has not yet been established or is incomplete/rudimentary during the early stages of the learning mode. Thus, at block 320 during these early stages of the learning mode, the in-guest agent 126 will be unable to verify many processes (e.g., unable to locate the process IDs, process attributes, etc. in a policy) for purposes of allowing file access (e.g., the answer is "No" at block 320), since the policy 128 at that stage may not yet exist or may not yet sufficiently identify many/most of the authorized processes. Therefore, the in-guest agent 126 treats the file access request as an "anomaly" that is appropriate for further analysis by the cloud manager 142. At block 340 ("Send alert to cloud manager"), the in-guest agent 126 sends an alert to the cloud manager 142 that an anomaly has been detected, including sending the collected information (associated with the process) to the cloud manager 142.

At block 350 ("Generate policy"), the cloud manager 142 receives the collected information from the in-guest agent 126, and generates (including updating) the policy 128 from the collected information. In one embodiment, the policy 128 can be in the form of a "file access map" or "manifest" or other data structure that identifies one or more of: the file attributes (e.g., file name, path, and ACLs), and a list of processes and their attributes (e.g., process name, cryptographic hash, etc. such as those previously identified above) that are allowed to access the file(s). As the cloud manager 142 receives newly collected information from the in-guest agent 126, the cloud manager 142 verifies the authenticity and/or correctness of the process by comparing the collected information with reference information, and then adds the collected information into the policy, so as to build or update the policy.

The verification of the authenticity and/or correctness of the process against reference information can be performed by the cloud manager 142 at block 350 in a number of ways. According to one embodiment, the cloud manager 142 validates the authenticity of the process by checking the collected information using one or more of the following, and then adds the process to the policy if the process is validated:

Software catalogs: Operating system vendors and/or application vendors usually publish or otherwise provide repositories of software catalogs that contain information (such as process hash, process path, package version, package vendor, and other package details) about processes. The cloud manager 142 of one embodiment may use this published information about processes to verify the integrity of the processes running in virtual machines deployed in the virtualized computing environment 100, such as by verifying that the collected information matches or is otherwise consistent with the published information.

Golden image: An operating system and all required software can be first installed on a "clean" virtual machine. The in-guest agent that runs on this "clean" virtual machine then starts collecting and sending information about the processes/applications to the cloud manager 142. The cloud manager 142 can use this information to build a golden image. The cloud manager 142 can then use this golden image as a reference to verify the integrity of the processes/applications running in other virtual machines in the virtualized computing environment 100.

Process reputation: The virtualized computing environment 100 can integrate products from third-party vendors such as Carbon Black or CounterTack. For example, the cloud manager 142 can run the processes through these third party vendors' products to verify the integrity of the processes.

Security team inputs: In some situations, information about custom applications/processes cannot be found in software catalogs published by vendors. In such situations, the processes can be directed to a security team member (such as a system administrator) to manually and/or automatically analyze the process to validate the integrity. If the security team member validates the integrity, then the process can be added to policy.

In some embodiments, verifying the correctness of the binary can be performed by the cloud manager 142 using one or more of the following:

If the cloud manager 142 determines that a package associated with a binary is not trustworthy, then the cloud manager 142 does not add the binary into the policy 128.

The cloud manager 142 tries to match the cryptographic hash (e.g., MD5 and SHA256) of the binary sent by the in-guest agent 126, with hashes embedded in the package contents and can be obtained from the published software catalogs or from the golden image. If there is a successful match, then the binary is determined to be correct and is added to the policy 128.

At block 350, the cloud manager 142 may store a "master copy" or a "working copy" of the policy 128 in the storage device 134A of the host-A 110A and/or at some other storage location in the virtualized computing environment 100. At certain points in time, the cloud manager 142 can push the policy to the in-guest agent 126 for storage at the virtual machine. In other embodiments, the virtual machine can pull the policy 128 from the cloud manager 142 at certain points in time. Providing the policy 128 to the in-guest agent 126 is shown at block 360 ("In-guest agent 126 receives policy through push/pull"). In some embodiments, the cloud manager 142 sends the policy 128 to the in-guest agent 126 via the GMM module 138. That is, the cloud manager 142 sends the policy 128 to the GMM module 138, which in turn sends the policy 128 to the in-guest agent 126. The GMM module 138 may also keep a copy of the policy 128 that is sent to the in-guest agent 126.

In some embodiments, the GMM module 138 is configured to protect the policy 128 (either or both the "master copy" at the cloud manager 142 or the copy provided to the in-guest agent 126) against tampering. For example, the GMM module 138 may be configured to one or more of: provide only the cloud manager 142 with write access to the master copy of the policy 128, prevent other components from writing to or otherwise modifying the master copy, ensure that the copy of the policy 128 provided to and used by the in-guest agent 126 matches the version that was last provided by the cloud manager 142, prevent the in-guest agent 126 and/or other components from modifying the copy of the policy 128 that is kept by the in-guest agent 126, or limit access to the copy of the policy 128 kept by the in-guest agent 126 such that only the in-guest agent 126 or the cloud manager 142 can access that copy of the policy. In some embodiments, the in-guest agent 126 is responsible for restricting write access (or other access) to the copy of the policy 128 kept by the in-guest agent, alternatively or additionally to the GMM module 138 controlling the access.

In some embodiments, the GMM module 138 may also be configured to ensure the integrity of the in-guest agent 126. For example, the GMM module 138 can be configured to prevent modification of the in-guest agent 126 except by the cloud manager 142, initiate an update to the in-guest agent 126 in response to a determination by the cloud manager 142 that a newer version of the in-guest agent 126 is available for installation, and other operations to maintain the in-guests agent 126.

The frequency that the cloud manager 142 provides an updated policy 128 to the in-guest agent 126 can vary from one embodiment to another. In some embodiments, an updated policy 128 may be provided each time that the cloud manager 142 makes an incremental update to the policy 128, such as after each new process is identified and added to the policy. In such embodiments, the frequency in which the in-guest agent 126 receives an updated policy is thus higher. In other embodiments, the cloud manager 142 can make or "accumulate" numerous updates to the master copy or working copy of the policy 128, and then provide the updated policy 128 to the in-guest agent 126. Thus, the updated policy 128 in such embodiments contains multiple pieces of updated information and can be obtained by the in-guest agent 126 at a lower frequency.

At block 370 ("Repeat for additional process"), the learning mode continues by returning to block 310 to trap additional file access requests from other processes. Thus, the learning mode is an iterative process in which the policy 128 is generated and progressively updated (or otherwise modified) to an increasingly comprehensive and current state, until the learning mode ends, and the virtual machine and in-guest agent 126 are switched to operating in the protected mode at block 220 in FIG. 1.

Figure 4:
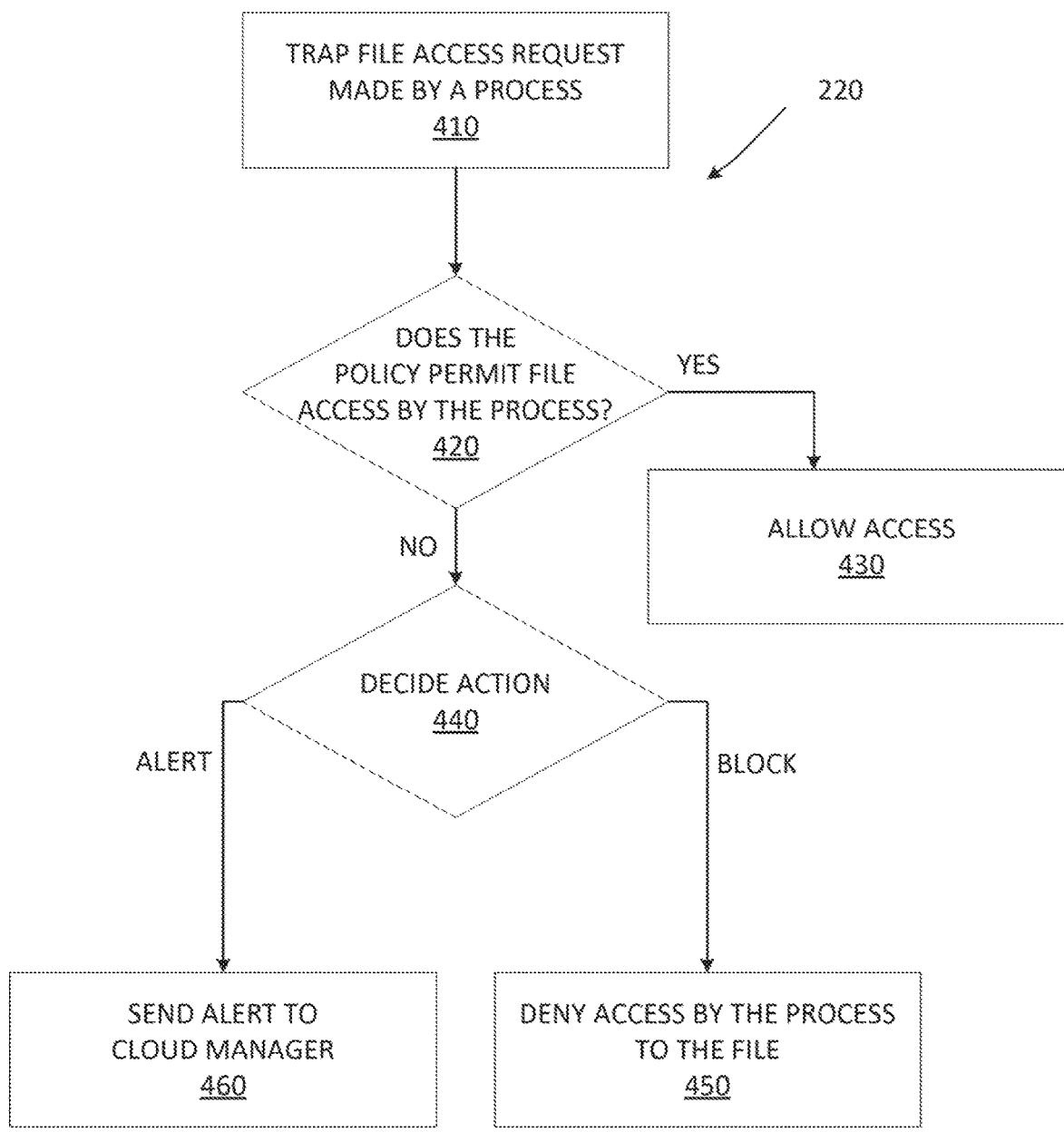
FIG. 4 is a flowchart of an example detailed process for a protected mode that can be performed by the method of FIG. 2 in the virtualized computing environment of FIG. 1.

FIG. 4 is a flowchart of an example detailed process for a protected mode that can be performed in the virtualized computing environment 100 of FIG. 1. Specifically, FIG. 4 shows more details of the operations that are performed by method 200 during protected mode in block 220 of FIG. 2, in accordance with one embodiment.

In the protected mode of FIG. 4, it is assumed that the cloud manager 142 has completed the generation of a policy 128 and has provided the policy 128 to the in-guest agent 126 for implementation/enforcement. Thus, there is now an available policy that has been generated based at least in part on previous process access patterns (behavior) and which can be used for identifying the expected behavior of incoming file access requests. Furthermore for the protected mode of FIG. 4, the virtual machine is no longer operating in the isolated and secure environment. For example, the sandboxing and restrictions on the virtual machine may have been removed or otherwise reduced, such that the virtual machine has relatively more freedom to access computing resources and relatively more interaction with other components in the virtualized computing environment 100, as compared to operation in the learning mode of block 210 of FIGS. 2 and 3.

The operations for the protected mode in FIG. 4 include block 410 ("Trap file access request made by a process") wherein attributes and other information associated with the file access request and with the process/application are collected, block 420 ("Does the policy permit file access by the process") wherein the collected information is checked against the policy 128 so as to determine whether the process is allowed to access the file system, and block 430 ("Allow access", which results from a "Yes" at block 420) wherein the file access request is released to enable the process to access the file system in response to a determination that the policy 128 permits the access. For the sake of brevity, some details about the operations at blocks 410, 420, and 430 are not repeated herein, since such operations are generally similar to the operations described above for respective blocks 310, 320, and 330 in FIG. 3 for the learning mode.

If at block 420, the in-guest agent 126 determines that the process is not identified as an authorized process in the policy 128 (e.g., a "No" at block 420), then the protected mode proceeds to block 440 ("Decide action"). In one embodiment, the determination at block 420 of whether the process is authorized by the policy 128 to access a file/data can be based on whether the process is identified in or is absent from the policy, whether the process is seeking to access a file in a manner that is different than what is specified in the policy 128, or whether there is any other deviation in the process and/or its attributes relative to what is specified in the policy 128. For example, the policy 128 may specify one or more of the following:

Which process can access the data;
Which user can access the data; and
Which process/user can modify the data.

In the example above, the policy 128 may for instance specify that a particular process may read a file but may not modify the file. Then, if the file access request indicates that the process wishes to both read the file and modify the file, then such file access request can be further examined at block 440 to decide on an appropriate course of action, since the file access request to modify the file is not authorized in the policy 128.

In one embodiment, the course of action taken by the in-guest agent 126 at block 440 can include "block" or "alert." With a "block" action, the in-guest agent 126 can make a relatively more affirmative and independent determination that the process has a high likelihood of being a rogue process, and therefore rejects the file access request outright, by blocking access by the process to the file system at block 450 ("Deny access by the process to the file"). In an embodiment, the in-guest agent 126 may determine at block 440 that a process is a rogue process, if the in-guest agent 126 locates the process in a "blacklist," for example. The in-guest agent 126, as part of denying access to the file, may also delete the rogue process at block 450.

In other scenarios, the in-guest agent 126 may be unable to more readily determine whether or not the process is a rogue process. That is, the in-guest agent 126 might be able to determine that the process is not specifically authorized by the policy 128 (because the process deviates from what is specified in the policy 128), but is otherwise unable to determine whether or not the process is a valid process that should be granted access to the file. In such a scenario, the in-guest agent 126 may at least temporarily deny access by the process to the file and send an alert to the cloud manager 142 at block 460 ("Send alert to cloud manager").

Sending the alert to the cloud manager 142 enables the system administrator or other member of the security team to more closely analyze the file access request and to compare the file access request against previous process access patterns, so as to decide whether to block the file access request (e.g., the in-guest agent 126 in cooperation with the cloud manager 142 confirms the denial of access to the file as a result), or to lift the denial of access so as to enable the process to access the file (e.g., block 450 in FIG. 4) and whether to trigger a recalibration or other update to the policy 128 to add the process (e.g., block 230 in FIG. 2).

In view of at least the foregoing, there are various example use scenarios for the embodiments described herein. In an example automated remediation implementation, a process' request to access a file/data can be allowed, or can be denied and identified as a non-whitelisted process. The process first be analyzed, and can then be deleted if determined to be a rogue process. Identification of the process and similar processes as a non-whitelisted process can be used to stop ransomware attacks that try to encrypt files.

In an example of a process-based ACL, an ACL can be provided that is both user-based and process-based. That is, a typical ACL identifies only the users that can access a file system. With a process-based ACL, another dimension is added to a typical ACL by providing a policy that identifies whitelisted processes that can access files. Thus, even if user permission is compromised, one embodiment of the process-based ACL can stop suspicious file access attempts by a process that is launched from an apparently valid (but actually compromised) user.

In still another example of a use scenario, an information map or other tracking of suspicious activity can be generated. As explained previously above, the various embodiment provide file access monitoring capability through which alarms are generated for operations that are being attempted by users and processes on files. These alarms are sent to the cloud manager 142 (e.g., block 460 in FIG. 4) where a system administrator or other security team member can use a management console/appliance to analyze the sequence of operations to infer various pieces of information, such as which process/user is the owner of the file. Based on the sequence of operations, an information map can be generated as part of a data leak event analysis, so as to see where the information has been leaked/compromised. In this manner, one embodiment can provide an information map that can be used to determine the origin, evolution, and spread of suspicious activity.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIG. 2 to FIG. 4. For example, computing devices capable of acting as host devices may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to control a process' access to a file system.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

What is claimed is:

1. A method to perform process-based file access control in a virtualized computing environment, the method comprising:
during a learning mode:
collecting, by an agent, information related to a plurality of processes that request access to at least one file stored in a file system associated with the virtualized computing environment, wherein a policy is generated from the collected information, and wherein the policy indicates that the plurality of processes are authorized to access the at least one file; and
during a protected mode:
trapping, by the agent, a file access request sent by a process, wherein the file access request is requesting access to the file system;
capturing, by the agent, information related to the process;
checking, by the agent, the captured information against the policy;
in response to the checking having verified that the process is one of the plurality of processes that are authorized to access the file system, allowing the process to access the file system; and
in response to the checking being unable to identify the process as one of the plurality of processes that are authorized to access the file system, denying access by the process to the file system.

2. The method of claim 1, wherein the process that is denied access includes a process launched by a user who is authorized to access the file system.

3. The method of claim 2, wherein the process that is denied access is associated with ransomware.

4. The method of claim 1, wherein collecting the information during the learning mode includes at least one of:
collecting package details related to at least one application associated with the plurality of processes;
collecting attributes associated with the plurality of processes during run-time;
collecting attributes associated with the plurality of processes prior to run-time;
collecting file name information and path information associated with the at least one file;
capturing information indicative of which process or user owns, has accessed, has modified, or has access rights to data associated with the at least one file; and
capturing information indicative of a frequency of usage of the data.

5. The method of claim 1, wherein denying access to the file system includes:
determining that the process is a rogue process; and
deleting the rogue process from a virtual machine, in the virtualized computing environment, that launched the rogue process.

6. The method of claim 1, wherein denying access to the file system includes:
sending an alert to a cloud manager, which generated the policy, to enable the cloud manager to further analyze the process;
confirming the denial of the access, in response to the further analysis having verified that the process is unauthorized; and
lifting the denial of the access to enable the process to access the file system, in response to the further analysis having verified that the process is authorized.

7. The method of claim 1, further comprising obtaining updates to the policy after detection of new processes that request access to the file system.

8. The method of claim 1, wherein the policy is generated by validation of the collected information against reference information provided by one or more of: a published software catalog, a golden image, a third-party vendor product that verifies integrity of processes, and security team input.

9. The method of claim 1, wherein the learning mode operates in a secure environment.

10. The method of claim 1, further comprising restricting write access to the policy to protect the policy against tampering.

11. A system to perform process-based file access control in a virtualized computing environment, the system comprising:
an agent;
wherein during a learning mode:
the agent is configured to collect information related a plurality of processes that request access to at least one file stored in a file system associated with the virtualized computing environment, wherein a policy is generated from the collected information, and wherein the policy indicates that the plurality of processes are authorized to access the at least one file; and
wherein during a protected mode:
the agent is configured to trap a file access request sent by a process and which is requesting access to the file system;
the agent is configured to capture information associated with the process;
the agent is configured to check the captured information against the policy;
the agent is configured to, in response to the checking having verified that the process is one of the plurality of processes that are authorized to access the file system, allow the process to access the file system; and
the agent is configured to, in response to the checking being unable to identify the process as one of the plurality of processes that are authorized to access the file system, deny access by the process to the file system.

12. The system of claim 11, wherein the process that is denied access includes a process launched by a user who is authorized to access the file system.

13. The system of claim 12, wherein the process that is denied access is associated with ransomware.

14. The system of claim 11, wherein to collect the information during the learning mode, the agent is configured to at least one of:

collect package details related to at least one application associated with the plurality of processes;

collect attributes associated with the plurality of processes during run-time;

collect attributes associated with the plurality of processes prior to run-time;

collect file name information and path information associated with the at least one file;

capture information indicative of which process or user owns, has accessed, has modified, or has access rights to data associated with the at least one file; and capture information indicative of a frequency of usage of the data.

15. The system of claim 11, wherein for the denial of access to the file system, the agent is configured to:

determine that the process is a rogue process; and delete the rogue process from a virtual machine, in the virtualized computing environment, that launched the rogue process.

16. The system of claim 11, wherein for the denial of access to the file system, the agent is configured to:

send an alert to a cloud manager, which generated the policy, to enable the cloud manager to further analyze the process;

confirm the denial of the access, in response to the further analysis having verified that the process is unauthorized; and lift the denial of the access to enable the process to access the file system, in response to the further analysis having verified that the process is authorized.

17. The system of claim 11, wherein the agent is further configured to obtain updates to the policy after detection of new processes that request access to the file system.

18. The system of claim 11, further comprising a cloud manager communicatively coupled to the agent and configured to generate the policy from the collected information, wherein to generate the policy, the manager is configured to validate the collected information against reference information provided by one or more of: a published software catalog, a golden image, a third-party vendor product that verifies integrity of processes, and security team input.

19. The system of claim 11, wherein the agent is installed in a virtual machine in the virtualized computing environment and configured to run in a background process in the virtual machine, and wherein the virtual machine is configured to operate in a secure environment during the learning mode.

20. The system of claim 11, further comprising a guest monitoring mode (GMM) module communicatively coupled to the agent, wherein the GMM module is configured to operate in a hypervisor or a secure enclave and to restrict write access to the policy to protect the policy against tampering.

* * * * *